United States Patent

[11] 3,571,907

| [72] | Inventor | Robert Douglas Watson<br>Deep River, Ontario, Canada |
|---|---|---|
| [21] | Appl. No. | 621,609 |
| [22] | Filed | Mar. 8, 1967 |
| [45] | Patented | Mar. 23, 1971 |
| [73] | Assignee | Atomic Energy of Canada Limited<br>Ottawa, Ontario, Canada |
| [32] | Priority | Mar. 21, 1966 |
| [33] | | Canada |
| [31] | | 955,358 |

[54] METHOD OF CLADDING A METAL SURFACE
4 Claims, 3 Drawing Figs.

[52] U.S. Cl. .................................................. 29/474.3,
29/197, 29/479, 29/497.5, 29/504, 29/523
[51] Int. Cl. ............................................................ B21d 39/04
[50] Field of Search.......................................... 29/470,
473.3, 473.4, 473.7, 474.3, 479, 493, 497.5, 197,
198; 29/488

[56] References Cited
UNITED STATES PATENTS
| 2,908,073 | 10/1959 | Dulin............................. | 29/197X |
| 2,937,438 | 5/1960 | Lemon........................... | 29/488 |
| 3,215,512 | 11/1965 | Coad............................. | 29/198X |
| 3,397,445 | 8/1968 | Ulmer et al. ................... | 29/479X |

FOREIGN PATENTS
| 690,908 | 4/1953 | Great Britain................ | 29/189 |
| 575,563 | 5/1959 | Canada ......................... | 29/470.1 |

OTHER REFERENCES

B.R. Garrett et al., Broad Applications of Diffusion Bonding, NASA CR-409, pp. 138— 139.

Garrett, B.R., " Broad Applications of Diffusion Bonding," Mar. 1966, p. 128, article from National Aeronautical and Space Administration Contractor Report, NASA CR-409.

Primary Examiner—John F. Campbell
Assistant Examiner—Ronald J. Shore
Attorney—James R. Hughes ABSTRACT: Aluminum cladding of zirconium alloy pressure tubes for nuclear reactors reduces the hydrogen pickup of the tubes. Cladding is achieved by heating in air both the aluminum and the alloy and stretch pressing, with sufficient pressure, the aluminum over the alloy. This technique appears to reduce the oxide layer on the aluminum to a sufficient concentration to permit bonding between the metals over 85 percent of the interface. Preferably the surface of the alloy is cleaned and polished immediately prior to heating.

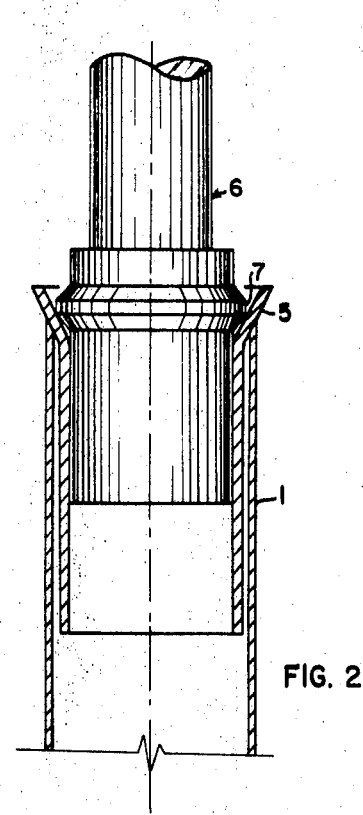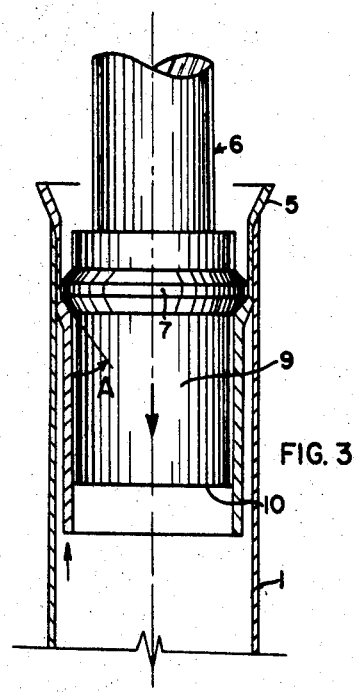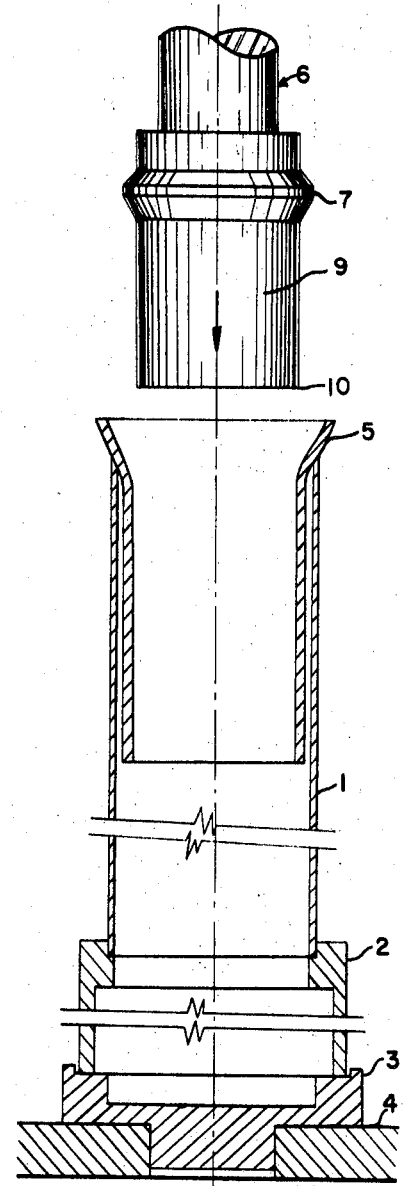
PATENTED MAR 23 1971  3,571,907
FIG. 2
FIG. 3
FIG. 1
INVENTOR
ROBERT D. WATSON
BY J.R. Hughes
AGENT

METHOD OF CLADDING A METAL SURFACE

This invention relates to a method of cladding a metal surface.

In nuclear reactors, pressure tubes are normally manufactured from a zirconium alloy, typically Zircaloy-2. This metal has a high hydrogen pickup. In organic cooled reactors the hydrogen pickup in Zircaloy-2 pressure tubes is expected to be greater than in pressurized water reactors.

It has been found that cladding such Zircaloy-2 pressure tubes with aluminum reduces such hydrogen pickup. Good cladding bonds have been formed between fresh hot aluminum from a die, and the oxidized surface of a Zircaloy-2 tube. A strong bond usually cannot be made if the aluminum that comes in contact with the oxidized surface of the Zircaloy-2 is also allowed to oxidize. For this reason, a good bond usually cannot be made by pressing two metal surfaces together because the oxide layers which cover the metal surfaces are not removed in the process. In order to bond aluminum to Zircaloy-2, it would appear that it is necessary to break up the oxide on the aluminum surface alone.

I have found that by stretching and forcing heated aluminum against heated Zircaloy-2 with sufficient pressure a cladding of Zircaloy-2 by aluminum is achieved over at least 85 percent of the interface. Such stretching and elongation of the heated aluminum just before it is forced against the surface of the heated Zircaloy-2 breaks up the oxide layer on the aluminum alone so as to produce a bond between the interfaces of the two metals.

The embodiments of the invention will be described reference being made to the accompanying drawings in which FIG. 1 is a partial cross-sectional view of a Zircaloy-2 tube and the inner aluminum sleeve with cladding ram positioned thereabove.

FIG. 2 is a partial cross-sectional view of the Zircaloy-2 tube, and aluminum sleeve with the cladding ram engaged therein immediately prior to cladding.

FIG. 3 is a partial cross-sectional view of the Zircaloy-2 tube and aluminum sleeve partial cladding of the upper part of the Zircaloy-2 tube having taken place.

A Zircaloy-2 tubing 1, having an inside diameter of 3¼ inches with an approximate wall thickness of either 0.115 inch or 0.155 inch, was placed on an anvil stand 2 which was placed on holder plate 3 and securing table 4.

A 3-inch outside diameter by 0.165-inch wall 1S aluminum sleeve 5, having frustoconical end, was placed within said tube 1. Said aluminum sleeve 5 was prepared from a 6-inch 1S aluminum tube having an outside diameter of 3 inches and a wall thickness of 0.165 inch. The same was machined from the outside by about one sixty-fourth inch to remove contamination that may have been introduced during the manufacture of the tube. Ram 6 at room temperature and coated with lanolin was forced down over the top end of the aluminum tube, such that the same bellied out at its top to form an aluminum sleeve 5 (see FIG. 1).

A ram 6 machined from hot work die steel such as "Crodi" substantially as shown in the drawings and having an annular force ring 7 of diameter larger than the body of ram 6 but slightly less than the interior diameter of the Zircaloy-2 tube 1. The ram 6 is then hardened to Rockwell C52.

The ram 6 is then secured by appropriate means to a hydraulic press and coated with lanolin. Several 1S aluminum tubes with exterior walls thereof machined to remove contamination are then bellied out as previously described to produce aluminum sleeves 5. The same are then thoroughly degreased with Trichlorethylene as is the ram 6. The interior of sleeves 5 is then coated with one layer of colloidal graphite in water care being taken to see that no graphite is applied to the outside surface of said sleeve 5. The ram 6 is also coated with colloidal graphite in water lubricant but two coats are applied, the first being permitted to thoroughly dry prior to applying the second coat.

The inside surface of Zircaloy-2 tube 1 is then cleaned and polished with 400 grit silicon carbide waterproof paper using water as a lubricant, rinsing with water, drying and then degreasing thoroughly with Trichlorethylene.

The then polished Zircaloy-2 tube 1, aluminum sleeve 5 and ram 6 are heated to about 950° F. as by placing in an electric furnace held at a temperature of about 1050° F. for 15 to 45 minutes in air atmosphere. The heated Zircaloy-2 tube 1 is then placed upon holder plate 3, the heated aluminum sleeve 5, within said tube 1 and the heated ram secured to a hydraulic press (not shown) and placed concentrically to and in axial alignment with said tube 1. The ram 6 is then lowered at a speed less than 6 inches per minute and this speed is maintained throughout its travel through said tube 1, and cladding is thereby accomplished. During cladding the sleeve 5 moves upward (upward arrow of FIG. 3) the ram 6 downward (downward arrow of FIG. 3).

It should be noted that the wall thickness of the cladded aluminum upon the interior of tube 1 is thinner than that of the sleeve 5 prior to cladding (see FIG. 3). This is accomplished because of the stretching as well as the expansion of the diameter of said sleeve 5 through angle A at and immediately below the annular force ring 7 of ram 6.

The cladding produced on the inside of the Zircaloy-2 tube 1 by the above method was not always uniform. The linings in a number of tubes were rippled on one side and this is believed to be caused by excessive out-of-roundness of the Zircaloy-2 tube 1. The rippling was always produced on one of the surfaces where the tube was widest. It was apparently caused by the shortage of aluminum during cladding operation. If the aluminum sleeve 5 is to be used up symmetrically then the aluminum must flow in from two directions, i.e., circumferential flow is limited by the frictional resistance of the aluminum and so probably contributes to the insufficient supply of aluminum where the Zircaloy-2 tube 1 is out of round. The rigidity of the sleeve 5 limits the amount of axial flow. And thus areas that require much more aluminum than the average become starved and rippled surfaces result.

Although molten salt may also be used as a lubricant in place and instead of the colloidal graphite, it was very fluid and consequently difficult to use. On the other hand, graphite has the disadvantage of having to be applied to the ram 6 and interior of sleeve 5 when the same are cold.

The thickness of the aluminum cladding was adjusted by changing the diameter of the force ring 7 of ram 6. Linings of aluminum from 0.0045 inch to 0.025 inch thick were quite satisfactory, although it was very difficult to apply very thin coatings (0.0045 inch) without breaking the connection between the cladded aluminum and the cladding aluminum as at 8. The tip 9 of ram 6 may also be slightly longer than the length of sleeve 5 such that the bottom circumferential edge 10 of the ram tip 9 does not dig into the aluminum and restrict its upward flow during the bonding process. The long tip of ram 6 also helps to keep the sleeve 5 positioned properly within tube 1 and to maintain its circular shape.

In the above description the invention has been described in relation to Zircaloy-2. Other zirconium alloy metals may be used, e.g. Zircaloy-4, and it should be pointed out that the invention may be put into practice with the various zirconium alloys especially developed for use in nuclear reactor structures.

I claim:

1. A method of cladding a heated zirconium alloy tube with aluminum, comprising the steps of:
   a. heating said zirconium alloy tube and said aluminum to oxidize surface layers of these members at said interfaces; and
   b. stretching and forcing said heated aluminum against said heated zirconium alloy tube to reduce said oxide layer on said aluminum to a sufficient concentration so as to cause only said oxide layer on said aluminum to break up and create a bond between said interfaces of said aluminum and said zirconium alloy tube.

2. A method according to claim 1, wherein said interfaces are cleaned before said zirconium alloy tube and said aluminum are heated.

3. A method according to claim 1, wherein said zirconium alloy tube and said aluminum are heated to at least 950° F 4. A method according to claim 1, wherein said zirconium alloy tube and said aluminum are heated to substantially 1050° F. for 15 to 45 minutes in air.